United States Patent [19]

Milligan

[11] Patent Number: 5,663,215
[45] Date of Patent: Sep. 2, 1997

[54] COATING COMPOSITIONS

[75] Inventor: Brian D. Milligan, Newcastle upon Tyne, England

[73] Assignee: Courtaulds Coatings (Holdings) Limited, England

[21] Appl. No.: 634,221

[22] Filed: Apr. 18, 1996

Related U.S. Application Data

[63] Continuation of Ser. No. 455,256, May 31, 1995, abandoned, which is a continuation of Ser. No. 244,930, Jul. 6, 1994, abandoned.

[30] Foreign Application Priority Data

Dec. 20, 1991 [GB] United Kingdom ............ 9127171

[51] Int. Cl.$^6$ ........................... C09D 143/04
[52] U.S. Cl. ............ 523/122; 575/58; 575/100; 575/104; 575/403; 575/431; 575/446; 575/453; 575/476; 427/386; 427/387; 427/393.5; 427/407.1; 428/413; 428/423.1; 428/447
[58] Field of Search ........................ 525/100, 403, 525/104, 58, 446, 453, 476; 427/386, 387, 407.1; 428/447, 417, 423.1; 523/122

[56] References Cited

U.S. PATENT DOCUMENTS

| | | | |
|---|---|---|---|
| 3,829,529 | 8/1974 | Lengnich et al. | 528/34 |
| 4,910,252 | 3/1990 | Yonehara et al. | 524/730 |
| 5,010,137 | 4/1991 | Umede et al. | 525/104 |
| 5,128,431 | 7/1992 | Riding et al. | 528/15 |
| 5,208,289 | 5/1993 | Takarada | 525/100 |
| 5,223,495 | 6/1993 | Inoue et al. | 524/188 |
| 5,344,880 | 9/1994 | Nambu et al. | 525/100 |
| 5,514,731 | 5/1996 | Nakai | 523/122 |
| 5,593,733 | 1/1997 | Griffith | 427/407.1 |

FOREIGN PATENT DOCUMENTS

| | | |
|---|---|---|
| 274428 | 7/1988 | European Pat. Off. . |
| 427293 | 5/1991 | European Pat. Off. . |

*Primary Examiner*—Ralph H. Dean
*Attorney, Agent, or Firm*—Nixon & Vanderhye

[57] ABSTRACT

A composition suitable for the production of an antifouling coating which comprises: (A) a polymer carrying pendent and/or terminal curable functional groups, at least a major proportion of the repeating units in the polymer (A) being other than siloxane units and (B) a curable organohydrogen polysiloxane or polydiorganosiloxane, the curable functional groups in component (A) being capable of undergoing a condensation curing reaction with component (B). The composition provides antifouling coating having good adhesion and mechanical durability and are used in aquatic or marine environments.

41 Claims, No Drawings

COATING COMPOSITIONS

This is a continuation of application Ser. No. 08/455,256, filed May 31, 1995 now abandoned, which is a continuation of 08/244,930, filed Jul. 6, 1994, now abandoned.

This invention relates to coating compositions, to the use of such compositions in forming protective coatings on substrates, and to substrates bearing such coatings. The invention relates more especially to the protection of substrates in aquatic environments, especially marine environments, and is concerned in particular with the provision of non-fouling protective coatings.

Man-made structures such as boat hulls, buoys, drilling platforms, oil production rigs and pipes which are immersed in water are prone to fouling by aquatic organisms such as green and brown algae, barnacles, mussels and the like. Such structures are commonly of metal, but may also comprise other structural materials such as concrete. This fouling is a nuisance on boat hulls, because it increases the frictional resistance towards movement through the water, with the consequence of reduced speeds and increased fuel costs. It is a nuisance on static structures such as the legs of drilling platforms and oil production rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence of reduced flow rates.

The commercially most successful methods of inhibiting fouling have involved the use of anti-fouling coatings containing substances toxic to aquatic life, for example tributyltin chloride or cuprous oxide. Such coatings, however, are being regarded with increasing disfavour because of the damaging effects such toxins can have if released into the aquatic environment. There is accordingly a need for non-fouling coatings which do not contain markedly toxic materials.

It has been known for many years, for example, as disclosed in GB 1 307 001 and U.S. Pat. No. 3,702,778 that silicone rubber coatings resist fouling by aquatic organisms. It is believed that such coatings present a surface to which the organisms cannot easily adhere, and they can accordingly be called non-fouling rather than anti-fouling coatings. Silicone rubbers and silicone compounds generally have very low toxic properties. Silicone rubber coatings have, however, gained little commercial acceptance. It is difficult to make them adhere well to the substrate surface that is to be protected, and they are mechanically rather weak and liable to damage.

EP 0 032 597 discloses that silicone polymers onto which organic polymeric segments are grafted may be vulcanised to form non-fouling coatings. The vulcanisation procedure may utilise a crosslinking agent such as tetraethyl orthosilicate and a catalyst such as a tin salt.

GB 2 188 938 discloses that vinylic polymers containing polymeric silicone side chains may be used to form thermoplastic non-fouling coatings.

GB Patent Application 2 192 400 discloses anti-fouling paint compositions which comprise a vinylic copolymer obtained by copolymerisation of:
(a) 1–50% by weight of a polymerisable unsaturated polysiloxane compound;
(b) 0–30% by weight of a polymerisable unsaturated alkoxysilane compound; and
(c) 20–99% by weight of a polymerisable unsaturated vinyl monomer other than (a) or (b).

The disclosed antifouling paint compositions may also comprise a hydroxyalkyl-tipped poly(diorganosiloxane) to the extent of 1–50 parts by weight per 100 parts by weight of the vinylic copolymer. The vinylic copolymer and the poly(diorganosiloxane) are not curable one with the other, and the coatings of the invention are thermoplastic and not vulcanised.

Coatings which contain a chemically inert oil or grease, often called a slipping agent, have been reported to offer improved resistance to fouling. GB 1 470 465 discloses the use of silicone oils as slipping agents in a vulcanised silicone rubber formulation. GB 1 581 727 discloses the use of silicone-free organic compounds, for example polyolefins with a molecular weight up to about 5000, as slipping agents in a vulcanised silicone rubber formulation.

The present invention provides a composition suitable for the production of protective coatings which comprises:
(A) a polymer carrying pendant and/or terminal curable functional groups, at least a major proportion of the repeating units in the polymer of (A) being other than siloxane units, and
(B) a curable organohydrogen polysiloxane or poly(diorganosiloxane),
the curable functional groups in component (A) being capable of undergoing a condensation curing reaction with component (B).

The invention also provides a process for forming a coating on a substrate, which comprises applying to the substrate a coating composition in accordance with the invention and causing or allowing the condensation reaction to take place. The invention further provides a substrate bearing a coating which has been applied by the process.

An especially important aspect of the present invention is the utilisation of the coating compositions to inhibit fouling of structures in aquatic and, in particular, marine environments, especially the hulls of ships. The compositions may also be used more generally, however, in providing, for example, non-stick, easy-clean or anti-graffiti coatings. Examples of such end uses include reduction of bio-fouling or other unwanted deposition in heat exchangers and reduction of deposition of denatured protein material in the production of UHT milk.

When a coating composition in accordance with the invention is applied to a substrate and cured as described, it has been found that the outermost surface region of the resulting coating is relatively rich in siloxane material, whereas the innermost region of the coating is relatively rich in the polymer of component (A), and it is believed that there will generally be a progressive increase in the concentration of siloxane material from the inner to the outer regions of the coating. As a result, the applied coating presents a siloxane-rich surface layer to the external environment and the good non-fouling and other protective properties associated with such material are obtained, but at the same time the mechanical weakness of previously proposed silicone rubber coatings is alleviated or avoided.

It has also been found that a coating formed from a composition of the invention will in general adhere well to a variety of substrate surfaces without the need to use an adhesion modifier or an intermediate tie-coat. Thus, the coating composition may be applied directly to the surface of the substrate, optionally after a preliminary protective treatment (for example, anti-corrosive treatment in the case of a metal substrate).

Component (A) may comprise curable functional groups selected from epoxy, amino, hydroxy and alkoxy groups and hydrogen atoms, and/or curable silicon-containing functional groups. Advantageously, component (A) comprises curable silicon-containing functional groups, and in one form of composition of the invention substantially all of the curable functional groups in component (A) are silicon-containing groups.

Component (A) may comprise pendant and/or terminal curable functional groups. Pendant curable functionality is preferred, for example, in the case where the polymer of component (A) is derived from one or more ethylenically unsaturated monomers, and terminal curable functionality is preferred, for example, if the polymer of component (A) is polyurethane, epoxy or polyester based.

The curing reaction between components (A) and (B) of a composition in accordance with the present invention, which may optionally also involve a cross-linking agent capable of participating in the curing reaction, will in general be a condensation cure which (in the case of curable silicon-containing functional groups) results in the formation of Si—O bonding between the components, and generally in the formation of a by-product corresponding to the curable functional groups participating in the reaction; other curing reactions, for example, hydrosilation, are also possible in principle.

Thus, for example, in the case of curable silicon-containing functional groups, the curing reaction may proceed as follows:

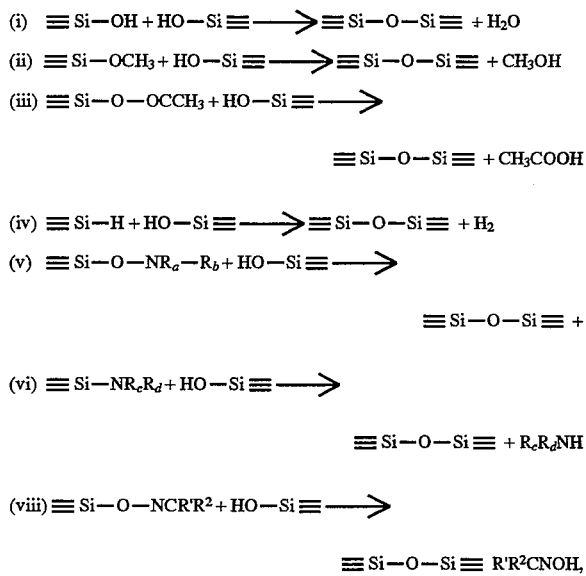

Although curable silicon-containing groups in component (A) may be silanol groups, the presence of such groups is not necessary and may lead to undesirable curing during storage, and it is certainly preferable for the curable silicon-containing groups to be other than trihydroxysilyl groups.

Advantageously, curable silicon-containing groups in component (A) are curable by virtue of one or more curable functional groups selected from aliphatic, aromatic and araliphatic ether, ester and oxime groups. Thus, for example, curable silicon-containing groups in component (A) comprise one or more oxime groups of the formula

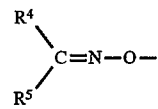

in which $R^4$ and $R^5$ may be the same or different and each represents a straight-chain or branched, saturated or unsaturated, aliphatic hydrocarbon radical, preferably having up to 7 carbon atoms, more especially up to 4 carbon atoms, especially a methyl or ethyl group; an aromatic group, for example, a phenyl group; or an araliphatic group, for example, a benzyl group; or $R^4$ and $R^5$ together represent an alkylene group; or one of $R^4$ and $R^5$ represents hydrogen. Preferably each of $R^4$ and $R^5$ is other than an aromatic group. A group $R^4$ and/or $R^5$ may be substituted or unsubstituted.

Curable silicon-containing groups in component (A) may contain more than one curable functional group bonded to silicon, and preferably contain three such groups. Thus, for example, curable silicon-containing groups in component (A) are preferably of the formula —Si(OR)$_3$ wherein R is a straight-chain or branched alkyl group having from 1 to 4 carbon atoms, preferably a methyl or ethyl group.

Preferably, pendant curable silicon-containing functional groups in component (A) are connected to the polymer by a chemical linkage that is resistant to aqueous hydrolysis in natural waters; sea water, for example, has pH 8.0–8.3. The silicon-containing bonds which are capable of undergoing condensation curing as described above, for example silyl ether and silyl ester, are therefore generally unsuitable for the purpose of attaching silicon-containing groups to the polymer backbone. It is preferred that the said chemical linkage should contain silicon directly linked to carbon. For example, the chemical linkage may comprise an alkylene group $C_nH_{2n}$ where n is a non-zero integer preferably having the value 1–5, an alkylidene group, or an arylene group, for example phenylene, or may be a direct chemical bond to a carbon atom in the polymer backbone.

Advantageously, the polymer of (A) is derived from one or more monomers (A1) which carry curable silicon-containing groups and one or more monomers (A2) which do not carry such groups. In the case of monomer(s) (A) carrying pendant curable silicon-containing groups, the molar proportion of monomer(s) (A1) to that of monomer(s) (A2) may be in the range of from 1% to 30% or 50%, for example from 5% to 16%, advantageously from 5% to 14%, preferably from 5% to 12%, and more especially from 5% to 10% or from 1% to 5%.

Polymers (A) carrying curable silicon-containing groups may expediently be manufactured by the polymerisation of one or more monomers containing such groups, advantageously with one or more comonomers which do not contain such groups. For example, such silicon-containing monomers may be derivatives of compounds such as acrylic acid, methacrylic acid, styrene, or ethylene. Examples of derivatives of acrylic and methacrylic acid are the esters in which the esterifying group includes the said silicon-containing group. As particular examples of such derivatives there may be mentioned 3-(trimethoxysilyl)propyl acrylate and methacrylate (I) and 3-(dimethyl(trimethoxysilyloxy)silyl)propyl acrylate and methacrylate (II) (Me represents=methyl).

$$CH_2=CRCO_2(CH_2)_3Si(OMe)_3 \quad \text{(I)} \quad \begin{array}{l}\text{R represents}\\\text{H or } CH_3\end{array}$$

$$CH_2=CRCO_2(CH_2)_3SiMe_2Si(OMe)_3 \quad \text{(II)} \quad \begin{array}{l}\text{R represents}\\\text{H or } CH_3\end{array}$$

Compound I(R represents $CH_3$) is particularly preferred.

Examples of derivatives of styrene as monomers (A1) are those in which a benzene ring is substituted both with a vinyl or 2-propenyl group and with a silicon-containing group. As particular examples of styrene derivatives there may be mentioned the isomeric trimethoxysilylstyrenes and the isomeric 2-(trimethoxysilylethyl)styrenes. As examples of derivatives of ethylene as monomers (A1) may be mentioned trimethoxyvinylsilane and triethoxyvinylsilane.

Instead of using monomers (A1) which already carry curable silicon-containing groups, it is possible (but less preferred) to graft such groups, for example trimethoxysilyl groups, onto a preformed polymer carrying suitable reactive sites at which the curable silicon-containing groups can be attached.

The polymer of component (A) may be derived from one or more ethylenically unsaturated monomers, more especially from one or more ethylenically unsaturated monomers selected from unsaturated aliphatic hydrocarbons, for example, ethylene, propylene and butylene; unsaturated halogenated hydrocarbons, for example, vinyl chloride, vinyl fluoride, vinylidene chloride and vinylidene fluoride; vinyl aromatic compounds, for example, vinyl pyridine, vinylnaphthalene, and styrene (including ring-substituted styrenes); unsaturated acids, esters, amides and nitriles; and N-vinyl compounds, for example, N-vinyl pyrrolidone, N-vinyl carbazole and N-vinyl caprolactam. Mention should also be made of polyvinylacetate and polyvinylalcohol.

As further possibilities, the polymer of component (A) may comprise repeating units derived from urethanes, ureas, urethane-ureas, amides, imides, amide-imides, epoxy compounds, and esters. Mention should also be made of alkyd resins and polyethers.

As particular examples of olefinic monomers may be mentioned such compounds as acrylic and methacrylic acids and their ester, amide and nitrile derivatives, styrene and vinyl chloride. Acrylate and methacrylate esters are preferred monomers, especially those derived from saturated alcohols containing 4–16 carbon atoms, such as the butyl, hexyl, octyl, decyl, dodecyl and hexadecyl esters. The incorporation of such fatty esters in the polymerisation has the advantage of producing polymers which are in the glassy state at room temperature and therefore have greater resistance to mechanical stress and impact than those polymers whose glass transition temperature is above the temperature of use of the coating. It may also be advantageous to incorporate one or more monomers with reactive functionality to promote adhesion to the underlying surface, for example epoxy functionality derived, for instance, from glycidyl acrylate or methacrylate, or amino functionality derived, for instance, from an aminoalkyl acrylate or methacrylate such as dimethylaminoethyl methacrylate.

As mentioned above, the polymers of the invention advantageously exhibit a glass transition temperature somewhat below the temperatures to which the coating will be exposed and the monomeric composition of the polymer should be selected with this in mind. Furthermore, it is generally advantageous on grounds of cost, and also to avoid excessive curing, to minimise the proportion of monomers (A1) carrying pendant curable silicon-containing groups in the polymer (A). In a preferred embodiment, the polymer (A) comprises 1–40% 3-(trimethoxysilyl)-propyl methacrylate (TMSPM) and 60–99% dodecyl methacrylate (lauryl methacrylate).

It may also be advantageous to utilise two or more different comonomers not containing a curable silicon group, for example a $C_{1-4}$ alkyl acrylate or methacrylate ester together with a $C_{6-16}$ acrylic or methacrylic ester. Thus, for example, in another preferred embodiment, polymer (A) is derived from the following monomers in the following molar proportions:

| TMSPM | | 5% |
|---|---|---|
| Lauryl or butyl acrylate | 40%) | |
| | ) | 95% |
| Methyl methacrylate | 60%) | |

Although the polymer of component (A) may include a proportion of siloxane repeating units, at least a major proportion of the repeating units, and preferably at least 55% of the units, are other than siloxane units. The proportion of siloxane repeating units is advantageously not more than 25%, preferably not more than 10%, and more especially not more than 5%. In a preferred form of composition, the polymer of component (A) is substantially free of siloxane repeating units.

Polymer (A) may have a number-average molecular weight in the range of from 1000 to 50 000, preferably from 5000 to 20 000, more especially from 5000 to 15 000.

If appropriate, a chain transfer agent may be used in the production of the polymer of component (A). As examples of chain transfer agents there may be mentioned 1-dodecanethiol and mercaptopropyltrimethoxysilane. The molecular weight of the polymer may also be controlled by varying the content of polymerisation initiator. Examples of preferred free-radical initiators include organic peroxides such as tert-butyl peroxy-2-ethyl-hexanoate (available under the trade name Trigonox 215) and the materials available under the trade names Trigonox 27 and Trigonox 41-C 75.

The polysiloxane of component (B) in a composition according to the invention may be an organohydrogenpolysiloxane or a polydiorganosiloxane. The polysiloxane may, for example, comprise a copolymer of diorganosiloxane units with organohydrogen siloxane units and/or with other diorganosiloxane units, or a homopolymer of organohydrogen siloxane units or of diorganosiloxane units.

The curable polysiloxane(s) of the present invention (B) may contain any of the functional groups, which may be pendant and/or terminal, described above in connection with component (A) as susceptible to polysiloxane curing. There are not the same disadvantages, however, arising from the presence of hydroxy groups in component (B) as in component (A), and the curable polysiloxane—component (B)—may be curable by virtue of hydroxy groups, preferably terminal hydroxy groups. The hydroxy groups may be alkanol groups or, preferably, silanol groups. Additionally or alternatively, component (B) may be curable by virtue of curable functional groups selected from aliphatic, aromatic and araliphatic ether, ester and oxime groups, which may be substituted or unsubstituted, or also trialkoxysilyl or hydrosilyl groups. A curable ether group may be, for example, an alkoxy group such as, for instance, methoxy or ethoxy. An example of a curable ester group is acetoxy.

Thus, by way of preferred example, the curable polysiloxane may be curable by virtue of oxime groups of the formula

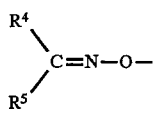

in which $R^4$ and $R^5$ may be the same or different and each represents a straight-chain or branched, saturated or unsaturated, aliphatic hydrocarbon radical, preferably having up to 7 carbon atoms, more especially up to 4 carbon atoms, especially a methyl or ethyl group; an aromatic group, for example, a phenyl group; or an araliphatic group, for example, a benzyl group, or $R^4$ and $R^5$ together represent an alkylene group, or one of $R^4$ and $R^5$ represents hydrogen. A group $R^4$ and/or $R^5$ may be substituted or unsubstituted.

Oxime-functional polysiloxanes may be prepared by reaction of the corresponding hydroxy-functional siloxane with a ketiminoxysilane, for example, methyl tris (methylethylketiminoxy) silane, or one or more of the following ketiminoxysilanes:

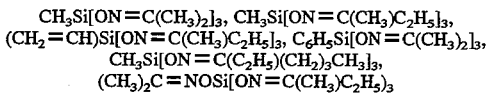

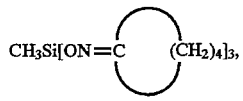

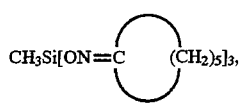

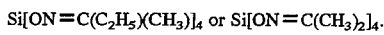

Preferred components (B) are linear polymers and advantageously have the structure $R^3O(SiR^1R^2O)_nR^3$, in which $R^1$ and $R^2$, which may be the same or different on each silicon atom and on different silicon atoms in the polymer, each represents an alkyl group such as, for example, methyl, ethyl, or propyl; an alkenyl group such as, for example, vinyl or allyl; a cycloalkyl or cycloalkenyl group; an aryl group such as, for example, phenyl; or a halogenated or cyano-substituted hydrocarbon group, with the proviso that one of $R^1$ and $R^2$ may represent hydrogen on some or all of the silicon atoms and that $R^1$ and $R^2$ may each represent hydrogen on some of the silicon atoms, $OR^3$ represents a curable functional group in which $R^3$ represents a monovalent radical such as, for example, hydrogen, alkyl, aryl or $R_4R_5CN$ where $R^4$ and $R^5$ are as hereinbefore defined, and n represents a degree of polymerisation. Preferably $R^1$ and $R^2$ are each methyl, although partial or total replacement of $R^2$ by phenyl may be of advantage.

The polysiloxane component (B) in a composition of the invention may have a number-average molecular weight in the range of from 1500 to 310 000, generally from 1800 to 80 000 or 85 000. Preferably, the number-average molecular weight of component (B) is at least 5000, advantageously at least 10 000, and more especially at least 15 000. The upper limit of molecular weight will usually be 60 000 or 70 000.

The polysiloxane component (B) preferably has a viscosity in the range of from 7.5 to 200 poise at 25° C. By way of illustration, it will in general be desirable to utilise a hydroxy-functional polysiloxane having a viscosity towards the upper end of the range, whereas for an oxime-functional polysiloxane it will in general be desirable to utilise a material having a viscosity towards the lower end of the range.

Advantageously, in a composition according to the invention, the proportion of component (A) is in the range of from 50 to 99% by weight, preferably from 84 to 98% by weight, more especially from 90 to 98% by weight, and the proportion of component (B) is in the range of from 1 to 50% by weight, preferably from 2 to 16% by weight, more especially from 5 to 16% by weight, in particular from 2 to 10% by weight, all percentages being based on the total weight of (A)+(B).

In a preferred form of composition according to the invention, the proportion of component (B) is at least 5% by weight, advantageously at least 10% by weight, and more especially from 10 to 25 or 30% by weight, all percentages being based on the total weight of (A)+(B). In general, there will be little or no advantage in using proportions of component (B) above 30 or 35% by weight, based on the total weight of (A)+(B).

A coating composition in accordance with the invention may include a catalyst for the condensation curing reaction and in general will include such a catalyst. Examples of catalysts which may be used include amines and the carboxylic acid salts of various metals, for example, tin, zinc, iron, lead, barium and zirconium. The salts are preferably salts of long-chain carboxylic acids, for example, dibutyltin dilaurate, dibutyltin dioctoate, iron stearate, tin (II) octoate and lead octoate.

Other possible catalysts include chelates such as, for example, dibutyltin acetoacetonate.

As a further possibility, the catalyst may comprise a halogenated organic acid, which has at least one halogen substituent on a carbon atom which is in α-position relative to the acid group, and/or at least one halogen substituent on a carbon atom which is in β-position relative to the acid group, or a derivative which is hydrolysable to form such an acid under the conditions of the condensation reaction.

Where appropriate in the following description, references to the acid catalyst include references to hydrolysable derivatives thereof.

The acid catalyst may be a mono-, di- or polybasic acid, but is preferably a monobasic acid.

The acid catalyst is a protonic acid and may comprise one or more carboxylic and/or sulphonic acid groups, preferably one or more carboxylic acid groups.

The or each halogen substituent may be fluorine, chlorine or bromine, but is preferably chlorine.

Advantageously, on an α- and/or a β-carbon atom of the acid catalyst, there are one or two fluorine substituents, from one to three chlorine substituents, or three bromine substituents. Thus, for example, the acid catalyst may comprise dichloroacetic acid, trichloroacetic acid or tribromoacetic acid.

There are preferably one or more halogen substituents on a carbon atom which is α- to the acid group, but if there is no halogen substituent on the α-carbon there will preferably be one or more other functional groups, for example hydroxy or oxo, on that carbon atom and one or more halogen substituents on the β-carbon. Thus, for example, the catalyst may comprise 3-dichloro-2-dihydroxy propanoic acid, or 3-trichloro-2-dihydroxy-propanoic acid.

The acid is advantageously an aliphatic acid, but may comprise one or more aromatic groups, such as phenyl or substituted phenyl, provided that there is preferably no aromatic group attached to the s-carbon atom or bonded directly to the acid group. An aromatic group may be a heterocyclic group, such as pyridyl or pyrrolyl. An aliphatic acid may be a cyclic or, preferably, an acyclic acid.

Advantageously, the catalyst is a halogenated alkanoic acid having up to 5 carbon atoms or a hydroxy-substituted derivative of such an acid.

As examples of acid derivatives which are hydrolysable to form the acids under the conditions of the condensation reaction there may be mentioned anhydrides, for instance, trichloroacetic acid anhydride, and esters, which may be hydrocarbyl esters, especialy methyl esters, or alkyl silyl esters, advantageously $C_{1-4}$ alkylsilyl esters, especially methylsilyl esters. Thus, for example, the catalyst may comprise trimethylsilyl-trichloroacetate.

If the catalyst contains more than one acid group, there may be halogen substitution on each α- and/or 62 -carbon atom or on only some of those carbon atoms.

The acid catalyst may carry one or more other substituents in addition to the specified halogen substitution.

Advantageously, an acid catalyst in accordance with the present invention is used as the sole condensation catalyst in the curing of siloxane systems, optionally in conjunction with one or more other acid catalysts of the invention but in the absence of any metal salt catalyst of the kind previously proposed. In particular, acid catalysts of the invention offer the possibility of dispensing with tin-based catalysts such as dibutyltin-dilaurate.

In addition, the use of an acid catalyst in accordance with the invention may offer one or more of the following advantages:
(1) It has been found that, when an acid catalyst of the invention is used, the siloxane curing reaction may require the presence of moisture to proceed. The use of such a catalyst therefore offers the possibility of providing one-pack coating compositions in which premature curing is substantially avoided.
(2) Siloxanes cured with the use of acid catalysts of the invention have been found to possess significantly improved adhesion to substrates such as glass and perspex poly(butylmethacrylate), and to anti-corrosive primer coatings.

The acid catalysts of the invention may be used not only in the curing of coating compositions in accordance with the invention, but also for condensation curing of siloxane systems generally and the invention accordingly also provides such use.

The catalytic activity of acid catalysts in accordance with the invention is illustrated by the following results obtained in the room temperature vulcanisation of a hydroxy-functional polydimethylsiloxane (PDMS), viscosity 35 poise, with tetraethyl orthosilicate (TEOS) as curing agent.

The proportions of the reactants were as follows:

|  | Parts by weight |
|---|---|
| PDMS | 96 |
| TEOS | 3.2 |
| Catalyst | 0.62 |

In each case, the catalyst was added neat to a solvent-free blend of the siloxane and the curing agent, and the following results were obtained:

| Catalyst | Activity |
|---|---|
| Dichloracetic acid | polymer cured overnight |
| Trichloroacetic acid | polymer cured overnight |
| Trichloroacetic anhydride | polymer cured overnight |
| Tribromoacetic acid | polymer cured overnight |
| Dichlorodihydroxy propanoic acid | polymer cured overnight |
| Trimethylsilyltrichloroacetate | polymer cured overnight |

In a further experiment, a mixture of solvent (xylene), siloxane polymer (hydroxy-functional PDMS), curing agent (TEOS) and catalyst (trichloroacetic acid) was stored in tightly sealed bottles and showed no gelation or viscosity increase over a 6-month period, thus showing that the acid-catalysed curing reaction will not proceed in the absence of moisture.

In another experiment, trichloracetic acid has been shown to have catalytic activity in systems cross-linked with an oxime-based curing agent, for example, vinyltris-(methylethylketoxime) or methyltris(methylethylketoxime).

The proportion of catalyst in the coating composition may be in the range of from 0.01 to 5% by weight, preferably from 0.05 to 1% by weight, based on the total composition. For example, 0.01–1% by weight on solids of dibutyltin dilaurate may be added to the coating composition soon before application to the surface to be coated. With such a level of catalyst, a coating of the present invention will typically cure tack-free within 1 day and be fully cured within 3–4 days.

Depending upon the nature of the components (A) and (B) and on the nature of the catalyst, it may be necessary for the catalyst to be packaged separately in a so-called "two-pot" system, or the catalyst may be packaged with one of the components but separately from the other.

A coating composition in accordance with the invention advantageously includes a cross-linking agent capable of participating in the condensation curing reaction. The use of a cross-linking agent tends to lessen the extent to which there is a visible and mechanically removable layer of unreacted siloxane material at the outer surface of the applied coating. It has been observed (using ATR-FTIR spectroscopy) that the concentration of siloxane at the outer surface of a coating formed from a composition including a cross-linking agent is greater than the siloxane concentration at the outer surface (after removal of unreacted siloxane) of a coating formed from a composition having no cross-linking agent.

Advantageously, the cross-linking agent comprises a functional silane, more especially a functional silane of the formula

in which the groups represented by $R^1$ to $R^4$ may be the same or different and each may comprise a straight-chain or branched, saturated or unsaturated, aliphatic hydrocarbon radical, preferably having up to 7 carbon atoms, more especially up to 4 carbon atoms, or an aromatic or araliphatic hydrocarbon radical, such as, for example, phenyl or benzyl, or an aliphatic or aromatic ether group, such as an alkoxy, phenoxy or benzyloxy group, or an ester group. An aliphatic group $R^1$ to $R^4$ is preferably an alkyl group, advantageously a $C_1$–$C_4$ alkyl group, preferably a methyl or ethyl group, and an alkoxy group $R^1$ to $R^4$ is advantageously C1–$C_4$ alkoxy, preferably methoxy or ethoxy. Preferred examples of alkoxysilanes of the formula (I) include tetraalkyl orthosilicates such as tetramethyl, -ethyl, -propyl or -butyl orthosilicate, dimethoxydimethyl silane and diethoxydimethyl silane. It will be appreciated that, in order to serve as a crosslinking agent, a compound of formula (I) must be at least difunctional. Any of the groups $R^1$ to $R^4$ in formula (I) may be unsubstituted or may be substituted by one or more substituents selected, for example, from halogen (especially chlorine or fluorine), amino groups or alkyl groups, which may themselves be substituted or unsubstituted.

Alternatively, a functional silane cross-linking agent may be reactive by virtue of one or more oxime groups of the formula

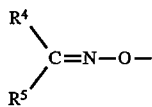

in which $R^4$ and $R^5$ may be the same or different and each represents a straight-chain or branched, saturated or unsaturated, aliphatic hydrocarbon radical, preferably having up to 7 carbon atoms, more especially up to 4 carbon atoms, especially a methyl or ethyl group; an aromatic group, for example, a phenyl group; or an araliphatic group, for example, a benzyl group, or $R^4$ and $R^5$ together represent an alkylene group, or one of $R^4$ and $R^5$ represents hydrogen. A group $R^4$ and/or $R^5$ may be substituted or unsubstituted.

Thus, the functional silane may be a ketiminoxy-silane, for example, methyl tris(methylethylketiminoxy) silane, or one or more of the following ketiminoxy silanes:

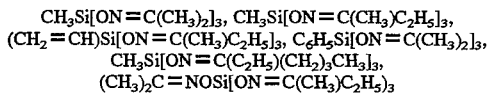

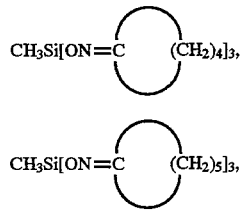

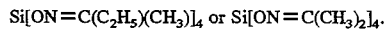

Other possible cross-linking or curing agents include oximes such as vinyltris(methylethylketoxime) or methyltris (methylethylketoxime).

As a further possibility, more particularly when organometallic catalysts are used, especially tin-based catalysts, the cross-linking or curing agent may comprise a cyclic compound of the following formula:

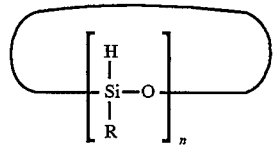

in which n is an integer of from 3 to 10, and R represents hydrogen or methyl.

A silane cross-linking agent may in principle be incorporated in a monomeric form or in the form of a self-condensation product, which may be, for example, a dimer, trimer, heptamer or a low molecular weight polymer.

Advantageously, especially when the cross-linking agent is a functional silane, the proportion of crosslinking agent may be in the range of from 0.05 to 10% by weight, generally from 2 to 5% by weight, based on the weight of component (B) in the composition.

It has been found that compositions according to the invention which comprise a polymer (A) which does not contain silanol groups and a poly(diorganosiloxane) (B) which does contain silanol groups are stable on storage provided that the polymer (A) does not contain groups known to be effective as catalysts in curing silicones, for example amines and the metal salts of carboxylic acids as mentioned above. It has further been found that compositions containing no silanol groups but containing groups effective as catalysts are stable in the absence of moisture.

The process for forming a coating according to the present invention is most conveniently carried out using a solution of the composition in a non-reacting volatile solvent for the composition, and the invention accordingly also provides such a solution. Suitable solvents include aromatic hydrocarbons, for example toluene, xylene and trimethylbenzene; ketones, for example 4-methylpentan-2-one (methylisobutylketone), 5-methylhexan-2-one (methylisoamylketone) and cyclohexanone; esters, for example butyl acetate and 2-ethoxyethyl acetate, and mixtures of the above with one another or with an aliphatic hydrocarbon, for example in the form of white spirit. Such solutions can be applied to the surface to be coated by any of the known methods such as brush-painting, roller-painting, spray-painting and using aerosol formulations. In order to minimise the use of solvent on both cost and environmental grounds, it is advantageous to use as concentrated a solution as possible which is compatible with the coating technique employed. A solution of a coating composition according to the invention may comprise at least 35% by weight solids, generally at least 50% by weight solids. More concentrated solutions, for example containing at least 70% solids, may be employed if the polymer component (A) is of low molecular weight. In principle, the maximum solids content may be as high as 90% by weight or even more, but in general the maximum practicable solids content will be in the range 75–85% by weight, typically 80% by weight.

The coating compositions of the present invention require the presence of water in order to achieve full cure. This water need not be specifically added, either during or after application of the composition. It has been found that atmospheric moisture or the water commonly found on damp surfaces to be coated is sufficient to induce curing, and it will not normally be necessary or appropriate to heat the applied coating for curing purposes.

Because compositions according to the invention are in general sensitive to the presence of water, it is preferable to take steps to minimise the water content of all ingredients of the composition, and it will be appreciated that no water or aqueous material should be added. Thus, for example, commercially available solvents will frequently contain a small amount of water (say, 1–2% by volume) and it is preferable to reduce the water content of such materials before use. In principle, such reduction in water content may be achieved by distillation in conjunction with a drying agent such as, for example, sodium, sodium hydride or calcium hydride or anhydrous calcium sulphate, but advantageously a reactive water-scavenger is used, for example, an inorganic salt such as, for example, magnesium sulphate (followed by filtration) or a mono- or di-functional silane, for instance, ethoxytrimethyl silane.

The compositions of the present invention and the coatings derived therefrom may also include one or more unreactive oils such as, for example, a silicone oil, especially a methyl phenylsilicone oil such as that sold by Rhone-Poulenc under the trademark "Rhodorsil Huile 550" or a petroleum or polyolefin oil or a polyaromatic oil.

It has proved to be especially advantageous, in terms of the enrichment of the outermost surface region of the applied coating with siloxane material (in some cases leading to the formation of a morphologically distinct outermost layer comprising siloxane material) for the composition to include a quantity of a petrolatum oil. In the case of coatings formed from a composition not including petrolatum, there will typically be a very thin layer of pure siloxane component at the outer surface, with a siloxane-rich layer underneath. In the case of a coating formed from the same composition but including petrolatum, a relatively thick siloxane-rich layer is formed, typically at least an order of magnitude thicker than the siloxane-rich layer formed without the use of petrolatum; such a siloxane-rich layer may comprise a 50/50 mixture of siloxane and petrolatum.

The proportion of petrolatum is advantageously in the range of from 5 to 25% by weight (based on the amount of component (A) preferably in the range of from 15 to 20% by weight. The proportion of petrolatum oil used may be higher than 25% by weight, but proportions above 25% by weight in unpigmented systems will in general lead to an undesirable decrease in the integrity of the applied coating. In the case of pigmented systems it may be possible to use a proportion of petrolatum oil above 25% by weight, possibly as high as 30% or 35% by weight.

If desired, a petrolatum oil may be used in conjunction with another unreactive oil such as an aromatic hydrocarbon oil or oils (AHO), or any of the other unreactive oils specifically mentioned hereinbefore.

The compositions of the present invention can be pigmented, for example at a pigment volume concentration of 0.5 to 25%, or dyed, or can be used as clear transparent coatings.

The compositions may also contain other excipients and/or fillers such as barium sulphate or other mineral fillers, pyrogenic silica, bentonite or other clays, typically in a proportion of from 0.5 to 5% by weight, preferably from 1 to 2% by weight.

The coating compositions of the present invention can be single-pack coatings for moisture cure, or a two-pack system may be used. Thus, for example, the polymer component (A) can be packaged separately from the polysiloxane (B), and any catalyst is preferably packaged separately from the polymer component (A).

Examples of possible two-pack systems are as follows:

|     | Pack I | Pack II |
| --- | --- | --- |
| (a) |  |  |
|     | Component (A) | Cross-linking agent |
|     | Component (B) | Catalyst |
|     | Pigment | Solvent |
|     | Filler |  |
|     | Solvent |  |
| (b) |  |  |
|     | Component (A) | Component (B) |
|     | Pigment | Cross-linking agent |
|     | Filler | Catalyst |
|     | Solvent | Solvent |

The coatings can be applied to steel, concrete, aluminium or fibre-reinforced polyester surfaces or over known anti-corrosive coatings such as epoxy, vinyl or alkyd coatings with good adhesion. Normally, an anti-corrosive coating will be applied to a metal substrate first.

The invention is illustrated by the following Examples:

PREPARATION EXAMPLE 1

Preparation of polymer (A) Monomers:

|  | Parts by weight |
| --- | --- |
| Methyl methacrylate | 590.06 |
| Lauryl methacrylate | 1000.01 |
| Trimethoxysilyl propyl methacrylate | 128.73 |

Procedure:

600 Parts of xylene were added to a reaction vessel. The xylene was heated under a slow stream of dry nitrogen to approximately 90° C., whereupon the introduction of the monomers (with 500 parts dry xylene and 8.77 parts azo-bisisobutyronitrile [AIBN] as initiator) was commenced. The feed rate of the monomers was adjusted to give a total addition time of approximately 5 hours.

Upon completion of the addition, the solution was maintained at 105°–110° C. for a further 1 hour, whereupon a further 0.87 parts of AIBN was added and the reaction mixture was maintained at 105°–110° C. for a further 2 hours. The concentration was adjusted to 65–70% solids. The resulting polymer possessed a Tg of −25° C. and a weight average molecular weight of approximately 10000.

PREPARATION EXAMPLE 2

Preparation of polymer

A ketoxime silane-functional siloxane polymer was prepared by blending 100 parts of an alpha, omega-hydroxyfunctional siloxane polymer (viscosity 7.5 poise, 25° C.) and 4 parts of methyltris(methylethylketoxime) silane in the absence of atmospheric moisture. The resulting fluid siloxane polymer had a viscosity of 15.2 poise at 25° C.

PREPARATION EXAMPLE 3

Preparation of polymer (A)

A polyurethane polymer for use as component (A) in a composition according to the invention was prepared under dry nitrogen according to the following formulation:

|  | Parts by weight |
| --- | --- |
| Polyurethane polyol (Equivalent Weight = 740) | 100 |
| dry methylethyl ketone | 33.33 |
| aminopropyl silane | 24.22 |

The aminopropyl silane was added dropwise so as to keep the temperature below 60° C. The resulting solution was allowed to stand overnight under dry nitrogen.

PREPARATION EXAMPLE 4

Preparation of polymer (A)

An epoxy polymer for use as component (A) in a composition according to the invention was prepared according to the following formulation:

| | Parts by weight |
|---|---|
| Epikote 1004* | 100 |
| dry methylethylketone | 24.9 |
| aminopropyl silane | 22.2 |

*Condensation product of bis-phenol A and epichlorohydrin.

The aminopropyl silane was added in one shot and the resulting solution was allowed to stand at room temperature overnight.

PREPARATION EXAMPLE 5

Preparation of polymer (A)

| Monomers: | Parts by weight |
|---|---|
| Butyl acrylate | 1000 |
| Methyl methacrylate | 782:11 |
| Trimethoxysilylpropyl methacrylate | 204.22 |
| 1-Dodecanethiol | 66.58 |

Procedure 325 parts of trimethylbenzene (TMB) were added to a reaction vessel. The TMB was heated under a slow stream of dry nitrogen to approximately 90° C. whereupon the introduction of the monomers (with 325 parts TMB and 10.248 part azobisisobutyronitrile [AIBN] as an initiator) was commenced. The feed rate of the monomers was adjusted to give a total addition time of approximately 5 hours.

Upon completion of the monomer feed, the solution was maintained at 100° C. for a further 1 hour whereupon a further 0.102 parts of AIBN was added and the reaction mixture was maintained at 100° C. for a further 2 hours. The resulting polymer possessed a $T_g$ of −20° C. and a weight average molecular weight (Mw) of approximately 10 000.

PREPARATION EXAMPLE 6

Preparation of Polyester

Stage I

| Monomers: | Parts by weight |
|---|---|
| Neo-pentyl glycol | 100.00 |
| Dimethylterephthalate | 74.62 |
| Catalyst (Fastcat 4010, a tin-based catalyst) | 0.245 |

To a 1 liter reaction vessel was added the neopentyl glycol, the dimethylterephthalate and the catalyst. The resulting mixture was heated to approximately 170° C. and held at that temperature until all the theoretical amount of methanol (approximately 64 g) had been removed. This required 1.5 h.

Stage II

| Monomers | Parts by weight |
|---|---|
| Adipic acid | 56.10 |
| Maleic anhydride | 11.13 |
| Xylene (solvent) | 60.20 |

Procedure

The adipic acid and maleic anhydride were added to the product of Stage I and the temperature was increased to approximately 190° C. and held at this temperature until 26 g of water had been removed. The xylene was then added and the temperature was reduced to approximately 170° C. and maintained until the remaining water of condensation had been removed. This required approximately 6 h.

PREPARATION EXAMPLE 7

Preparation of sibyl adduct of the Polyester prepared in Example 6

Using the polyester prepared in Preparation Example 6 a silyl adduct for use as component (A) in a composition according to the invention was prepared according to the following formulation:

| | Parts by weight |
|---|---|
| Polyester | 100 |
| Xylene | 29.35 |
| Amino silane* | 17.42 |

*Union Carbide silane A-1170

The amino silane was added in a single shot, under dry nitrogen, and the reaction vessel was allowed to stand overnight at room temperature.

The following composition Examples illustrate the coating compositions of the present invention:

COMPOSITION EXAMPLE 1

The following ingredients were mixed in a paint dispenser:

| | Parts by weight |
|---|---|
| Polymer (A) of Preparation Example 1 | 100 |
| alpha, omega-hydroxyfunctional siloxane (viscosity 200 poise) | 20 |
| pyrogenic silica (Aerosil R 972) | 1.2 |
| dibutyltindilaurate (catalyst) | 0.1 |
| dry xylene | 60 |

COMPOSITION EXAMPLE 2

Composition Example 1 was repeated but using 0.1 parts trichloroacetic acid as catalyst instead of the dibutyltindilaurate.

COMPOSITION EXAMPLE 3

Composition Example 1 was repeated but using the ketoxime silane-functional siloxane polymer of Preparation Example 2 instead of the hydroxyfunctional siloxane polymer of Composition Example 1.

COMPOSITION EXAMPLE 4

Composition Example 3 was repeated but using 0.1 parts trichloroacetic acid as catalyst in place of dibutyltindilaurate.

COMPOSITION EXAMPLE 5

The following ingredients were mixed in a paint dispenser:

|  | Parts by weight |
| --- | --- |
| Polymer (A) of Preparation Example 3 | 100 |
| hydroxy-functional siloxane polymer (viscosity 200 poise) | 52.56 |
| dibutyltindilaurate | 0.92 |
| dry methylethylketone | 82.14 |

COMPOSITION EXAMPLE 6

|  | Parts by weight |
| --- | --- |
| Polymer (A) of Preparation Example 4 | 100 |
| hydroxy-functional siloxane polymer (viscosity 200 poise) | 46.08 |
| dibutyltindilaurate | 0.76 |
| dry methylethylketone | 78.66 |

COMPOSITION EXAMPLE 7

Composition Example 1 was repeated but with the addition of 0.125 parts by weight of tetraethyl orthosilicate (TEOS).

COMPOSITION EXAMPLE 8

Composition Example 1 was repeated but with the addition of 0.125 parts by weight of dimethyldiethoxy silane.

COMPOSITION EXAMPLE 9

The following ingredients were mixed in a paint dispenser:

|  | Parts by weight |
| --- | --- |
| Polymer (A) of Preparation Example 1 | 100 |
| alpha, omega-hydroxy functional siloxane (viscosity 7.5 or 200 poise) | 31.25 |
| petrolatum | 25.00 |
| pyrogenic silica (Aerosil R 972) | 1.2 |
| TEOS | 0.156 |
| dibutyltindilaurate (catalyst) | 0.1 |
| dry xylene | 84.13 |

COMPOSITION EXAMPLE 10

The following ingredients were mixed in a paint dispenser:

|  | Parts by weight |
| --- | --- |
| Polymer (A) of Preparation Example 1 | 100 |
| alpha, omega-hydroxyfunctional siloxane (viscosity 7.5 or 200 poise) | 34.02 |
| petrolatum | 25.00 |
| aromatic hydrocarbon oils (AHO) | 11.11 |
| pyrogenic silica (Aerosil R 972) | 1.2 |
| TEOS | 0.170 |
| dibutyltindilaurate (catalyst) | 0.1 |
| dry xylene | 91.60 |

COMPOSITION EXAMPLE 1

The following ingredients were mixed in a paint dispenser:

|  | Parts by weight |
| --- | --- |
| Polymer (A) of Preparation Example 5 | 459.08 |
| Bentone SD1 | 16.508 |
| Trimethylbenzene (solvent) | 377.57 |
| TEOS | 0.583 |
| alpha, omega-hydroxyfunctional siloxane (viscosity 7.5 or 200 poise) | 114.709 |
| Titanium dioxide (Tiona 472) | 107.320 |
| Dibutyltindilaurate (catalyst) | 1.206 |

COMPOSITION EXAMPLE 12

The following ingredients were mixed in a paint dispenser:

|  | Parts by weight |
| --- | --- |
| Polymer (A) of Preparation Example 5 | 100 |
| alpha, omega-hydroxyfunctional siloxane (viscosity 7.5 or 200 poise) | 42.02 |
| Dibutyltindilaurate | 0.21 |
| TEOS | 0.210 |
| TMB (dry solvent) | 95.916 |
| Petrolatum | 25.00 |
| AHO | 11.11 |

COMPOSITION EXAMPLE 13

The following ingredients were mixed in a paint dispenser:

|  | Parts by weight |
| --- | --- |
| Polymer (A) of Preparation Example 7 | 100 |
| alpha, omega-hydroxyfunctional siloxane (viscosity 200 poise) | 25 |
| dibutyltindilaurate | 0.312 |
| solvent (xylene) | 53.56 |

Anti-Fouling Testing

Composition Examples 1, 2 and 3 were coated on formica and wood substrates primed with an anticorrosive and allowed to cure. The coated substrates were immersed in a marine estuary known for its weed, slime and shell-fish fouling. After one season (Feb.–Oct.) the accumulated fouling could be easily removed with light rubbing or a low pressure water jet. Accumulated fouling on control panels of formica or wood not coated with the Compositions of the invention but maintained under the same conditions over the same period could not be similarly removed.

I claim:

1. A process for inhibiting fouling of a substrate in a fouling environment, which comprises applying to the substrate, before exposure to the said environment, a composition which comprises:
   (A) a polymer carrying pendant and/or terminal curable functional groups, at least a major proportion of the repeating units in the polymer of (A) being other than siloxane units, and
   (B) a curable organohydrogen polysiloxane or polydiorganosiloxane, the curable functional groups in component (A) being capable of undergoing a curing reaction with component (B),
   and curing the applied composition.
2. A process as claimed in claim 1, component (A) comprises pendant curable functional groups.

3. A process as claimed in claim 1 wherein component (A) comprises curable silicon-containing functional groups.

4. A process as claimed in claim 1 wherein the polymer of (A) is derived from one or more monomers (A1) which carry curable silicon-containing groups and one or more monomers (A2) which do not carry such groups.

5. A process as claimed in claim 4, wherein the monomer (s) (A1) carry pendant curable silicon-containing groups and the molar proportion of monomer(s) (A1) to that of monomers (A2) is in the range of from 1% to 50%.

6. A process as claimed in claim 1, wherein component (A) comprises curable silicon-containing groups which are curable by virtue of one or more curable functional groups selected from aliphatic, aromatic and araliphatic ether, ester and oxime groups.

7. A process as claimed in claim 6, wherein curable silicon-containing groups in component (A) comprise one or more oxime groups of the formula

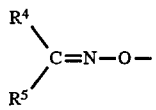

in which $R^4$ and $R^5$ may be the same or different and each represents a straight-chain or branched, saturated or unsaturated, aliphatic hydrocarbon radical, an aromatic group, or an araliphatic group, or $R^4$ and $R^5$ together represent an alkylene group, or one of $R^4$ and $R^5$ represents hydrogen.

8. A process as claimed in claim 1, wherein component (A) comprises curable silicon-containing groups which contain more than one curable functional group bonded to silicon.

9. A process as claimed in claim 8, wherein curable silicon-containing groups in component (A) are of the formula

wherein R is a straight-chain or branched alkyl group having from 1 to 4 carbon atoms.

10. A process as claimed in claim 1 wherein component (A) comprises curable silicon-containing groups which are other than trihydroxysilyl groups.

11. A process as claimed in claim 1 wherein component (A) comprises pendant curable silicon-containing functional groups which are connected to the polymer by a chemical linkage that is resistant to aqueous hydrolysis in natural waters.

12. A process as claimed in claim 11, wherein the chemical linkage comprises an alkylene, alkylidene or arylene group, or a direct bond.

13. A process as claimed in claim 1, wherein substantially all of the curable functional groups in component (A) are silicon-containing groups.

14. A process as claimed in claim 1 wherein component (A) comprises curable functional groups selected from the group consisting of epoxy, amino, hydroxy, alkoxy groups and hydrogen atoms.

15. A process as claimed in claim 1, wherein the proportion of siloxane repeating units in component (A) does not exceed 25%.

16. A process as claimed in claim 15, wherein component (A) is substantially free from siloxane repeating units.

17. A process as claimed in claim 1 wherein the polymer of component (A) is derived from one or more ethylenically unsaturated monomers.

18. A process as claimed in claim 17 wherein the polymer of component (A) is derived from one or more ethylenically unsaturated monomers selected from the group consisting of unsaturated aliphatic hydrocarbons; unsaturated halogenated hydrocarbons; vinyl aromatic compounds; unsaturated acids, esters, amides and nitriles; and N-vinyl compounds.

19. A process as claimed in claim 1, wherein the curable polysiloxane (B) is curable by virtue of hydroxy groups, which may be silanol groups.

20. A process as claimed in claim 19, wherein the curable polysiloxane (B) is curable by virtue of terminal hydroxy groups.

21. A process as claimed in claim 1, wherein the curable polysiloxane (B) is curable by virtue of curable functional groups selected from the group consisting of aliphatic, aromatic and araliphatic ether, ester and oxime groups, trialkoxysilyl and hydroxy groups.

22. A process as claimed in claim 21, wherein the curable polysiloxane (B) is curable by virtue of oxime groups of the formula

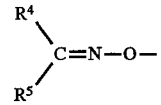

in which $R^4$ and $R^5$ may be the same or different, substituted or unsubstituted, and each represents a straight-chain or branched, saturated or unsaturated, aliphatic hydrocarbon radical, an aromatic group, or an araliphatic group, or $K^4$ and $R^5$ together represent an alkylene group, or one of $R^4$ and $R^5$ represents hydrogen.

23. A process as claimed in claim 1, wherein component (B) comprises a linear polymer.

24. A process as claimed in claim 23, wherein component (B) has the structure $R^3O(SiR^1R^2O)_nR^3$, in which $R^1$ and $R^2$, which may be the same or different on each silicon atom and on different silicon atoms in the polymer, each represents an alkyl group; an alkenyl group, a cycloalkyl or cycloalkenyl group; an aryl group; or a halogenated or cyano-substituted hydrocarbon group, with the proviso that one of $R^1$ and $R^2$ may represent hydrogen on some or all of the silicon atoms and that $R^1$ and $R^2$ may each represent hydrogen on some of the silicon atoms, $OR^3$ represents a curable functional group in which $R^3$ represents a monovalent radical and n represents a degree of polymerization.

25. A process as claimed in claim 1, wherein component (B) has a number-average molecular weight in the range of from 5000 to 85000.

26. A process as claimed in claim 1, wherein the curing reaction is a condensation curing reaction and the composition includes a cross-linking agent capable of participating in the said reaction.

27. A process as claimed in claim 26, wherein the cross-linking agent comprises a functional silane.

28. A process as claimed in claim 1 wherein the composition includes one or more unreactive oils selected from the group consisting of silicone oils, petroleum oils, polyolefin oils, and polyaromatic oils.

29. A process as claimed in claim 1, wherein the curing reaction is a condensation curing reaction and the composition includes a catalyst for the said reaction.

30. A process as claimed in claim 29, wherein the catalyst comprises a halogenated organic acid, which has at least one halogen substituent on a carbon atom which is in α-position relative to the acid group, and/or at least one halogen substituent on a carbon atom which is in β-position relative to the acid group, or a derivative which is hydrolyzable to form such an acid under the conditions of the condensation reaction.

31. A process as claimed in claim 1, wherein the proportion of component (A) is in the range of from 50 to 99% by weight and the proportion of component (B) is in the range of from 1 to 50% by weight, the percentages being based on the total weight of (A)+(B).

32. A process as claimed in claim 1 wherein the proportion of component (B) is at least 5% by weight, based on the total weight of (A)+(B).

33. A process as claimed in claim 1, wherein the composition includes a non-reacting volatile solvent.

34. A process as claimed in claim 33, wherein the composition comprises at least 35% by weight solids.

35. A process as claimed in claim 1, in which the coating composition is applied directly to the surface of the substrate or on to an anti-corrosive layer thereon.

36. A process as claimed in claim 1, wherein the fouling environment is an aquatic environment.

37. A process as claimed in claim 1, wherein the fouling environment is a marine environment.

38. A substrate in a fouling environment and bearing a coating formed from a composition as defined in claim 1.

39. A substrate as claimed in claim 38, which is a marine structure.

40. A process for inhibiting fouling of a substrate in a fouling environment, which comprises applying to the substrate, before exposure to the said environment, an anti-corrosive primer coating and thereafter, an anti-fouling composition which comprises:

(A) a polymer carrying pendant and/or terminal curable functional groups, at least a major proportion of the repeating units in the polymer of (A) being other than siloxane units, and (B) a curable organohydrogen polysiloxane or polydiorganosiloxane, the curable functional groups in component (A) being capable of undergoing a curing reaction with component (B), and curing the applied composition, wherein the concentration of the siloxane component (B) progressively increases from the substrate to the outer regions of the coating thereby presenting a siloxane-rich surface layer to the fouling environment.

41. A substrate in a fouling environment bearing a cured coating formed from a composition which comprises:

(A) a polymer carrying pendant and/or terminal curable functional groups, at least a major proportion of the repeating units in the polymer of (A) being other than siloxane units, and (B) a curable organohydrogen polysiloxane or polydiorganosiloxane, the curable functional groups in component (A) being capable of undergoing a curing reaction with component (B), wherein the concentration of the siloxane component (B) progressively increases from the substrate to the outer regions of the coating thereby presenting a siloxane-rich surface layer to the fouling environment and the coating renders substrate resistant to fouling.

* * * * *